United States Patent
Line et al.

(10) Patent No.: US 10,011,205 B2
(45) Date of Patent: Jul. 3, 2018

(54) VALUE ASSEMBLY FOR SEATBACKS AND CUSHIONS

(71) Applicant: Ford Global Technologies, LLC, Dearborn, MI (US)

(72) Inventors: Johnathan Andrew Line, Northville, MI (US); Marc Silva Kondrad, Macomb, MI (US); Brett Ronzi, Highland, MI (US); Christian J. Hosbach, Taylor, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 14/619,573

(22) Filed: Feb. 11, 2015

(65) Prior Publication Data
US 2016/0229322 A1   Aug. 11, 2016

(51) Int. Cl.
| | | |
|---|---|---|
| *B60N 2/64* | (2006.01) | |
| *B60N 2/68* | (2006.01) | |
| *B60N 2/60* | (2006.01) | |
| *B60N 2/66* | (2006.01) | |
| *B60N 2/80* | (2018.01) | |

(52) U.S. Cl.
CPC .......... *B60N 2/682* (2013.01); *B60N 2/6009* (2013.01); *B60N 2/64* (2013.01); *B60N 2/6671* (2015.04); *B60N 2/6673* (2015.04); *B60N 2/68* (2013.01); *B60N 2/80* (2018.02)

(58) Field of Classification Search
CPC . B60N 2/12; B60N 2/48; B60N 2/682; B60N 2/64; B60N 2/68; B60N 2/62; B23P 2700/50
USPC ......... 297/452.48, 452.52, 452.59, 391, 410; 296/65.09, 65.13
See application file for complete search history.

(56) References Cited

U.S. PATENT DOCUMENTS

| | | | |
|---|---|---|---|
| 5,895,094 A * | 4/1999 | Mori .................... | B60N 2/4814 297/391 |
| 6,010,195 A | 1/2000 | Masters et al. | |
| 8,789,400 B2 | 7/2014 | Roszczenko et al. | |
| 8,840,178 B2 | 9/2014 | Mitsuoka et al. | |
| 2011/0121624 A1* | 5/2011 | Brncick ............... | B60N 2/0232 297/284.2 |
| 2012/0133193 A1* | 5/2012 | Abe ..................... | B60N 2/5825 297/452.55 |

(Continued)

FOREIGN PATENT DOCUMENTS

WO    2014127355 A1    8/2014

*Primary Examiner* — Christopher Besler
(74) *Attorney, Agent, or Firm* — Vichit Chea; Price Heneveld LLP

(57) ABSTRACT

A method of assembling a vehicle seat assembly is provided. The method comprises the steps of providing a preassembled front seatback module and a seatback frame. The method further includes assembling a seatback assembly by coupling the front seatback module to a preassembled rear seatback module around and interconnected to the seatback frame. The method further includes providing a preassembled seat module and pivotally coupling the seat module to the seatback assembly. The assembly method further includes coupling the seat module to a seat frame, and further coupling a preassembled headrest module to an upper portion of the seatback assembly.

14 Claims, 9 Drawing Sheets

(56) References Cited

U.S. PATENT DOCUMENTS

| | | | |
|---|---|---|---|
| 2013/0320742 A1* | 12/2013 | Murolo | B60N 2/68 297/452.18 |
| 2014/0021754 A1* | 1/2014 | Jung | B60N 2/44 297/217.6 |
| 2014/0028072 A1* | 1/2014 | Ronzi | B60N 2/4811 297/410 |

* cited by examiner

VALUE ASSEMBLY FOR SEATBACKS AND CUSHIONS

FIELD OF THE INVENTION

The present invention generally relates to a vehicle seat assembly, and more particularly, to a vehicle seat and an improved method of assembling the vehicle seat.

BACKGROUND OF THE INVENTION

Vehicle seat assemblies are becoming more and more complex with the addition of new features desired by consumers. The current solutions for assembling vehicle seats include a ground-up assembly using hundreds of parts which is time consuming and complicated. Accordingly, vehicle seats that can be delivered and assembled in a cost efficient manner are becoming increasingly important. Further, vehicle seats that can deliver the feature content desired by consumers in a fully integrated seat that is assembled using a limited number of preassembled modular components is desired.

SUMMARY OF THE INVENTION

One aspect of the present invention includes a method of assembling a vehicle seat assembly, wherein the method comprises the steps of providing a preassembled front seatback module and a seatback frame. The method further includes assembling a seatback assembly by coupling the front seatback module to a preassembled rear seatback module around and interconnected to the seatback frame. The method further includes providing a preassembled seat module and pivotally coupling the seat module to the seatback assembly. The assembly method further includes coupling the seat module to a seat frame, and further coupling a headrest module to an upper portion of the seatback assembly.

Another aspect of the present invention includes a method of assembling a vehicle seat assembly, wherein the method comprises the steps of assembling a front seatback module, assembling a rear seatback module, assembling a seat module, and assembling a headrest module. The method further includes assembling a seatback assembly by coupling the front seatback module and the rear seatback module to a seatback frame. The method further includes coupling the seat module to the seatback assembly in a pivoting manner and finally, coupling the headrest module to the seatback frame of the seatback assembly.

Yet another aspect of the present invention includes a method of assembling a vehicle seat assembly, wherein the method comprises the steps of providing a set of preassembled seat modules, wherein the set includes a front seatback module, a rear seatback module, a headrest module and a seat module. The method further includes coupling the seat module to a seat frame, and further coupling the front seatback module to the rear seatback module around a seatback frame to form a seatback assembly. The method further includes coupling the headrest module to the seatback assembly, and pivotally coupling the seatback assembly to the seat module to form the fully assembled vehicle seat assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
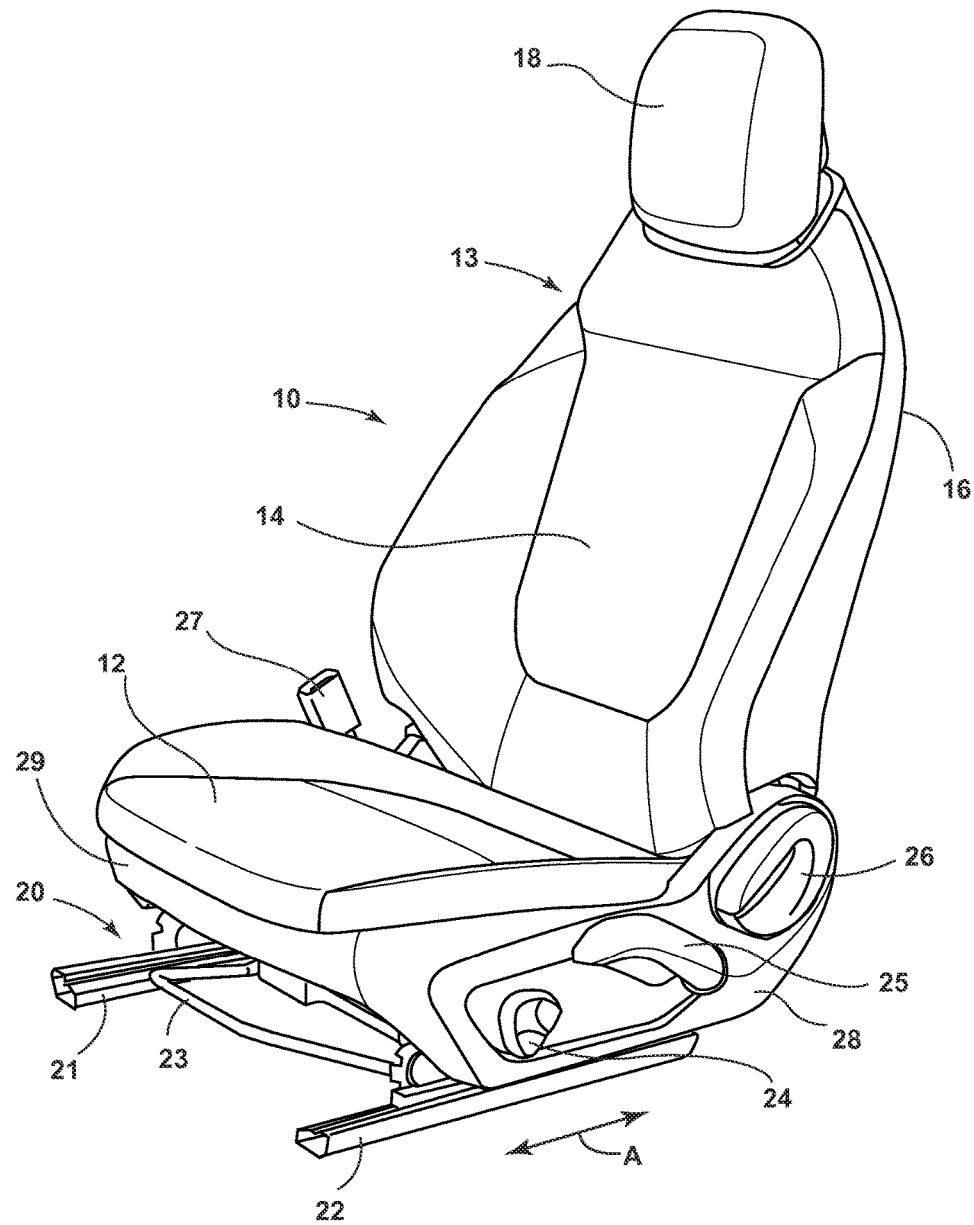
FIG. 1 is a perspective view of a vehicle seat assembly according to one embodiment of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, reference numeral 10 generally designates a vehicle seat assembly. The vehicle seat assembly 10 includes a seat module 12 and a seatback 13 which, in assembly, is pivotally mounted to the seat module 12. The seatback 13 includes a front seatback module 14 and a rear seatback module 16. A headrest module 18 is coupled to the seatback 13 at an upper portion thereof. The seat module 12 is operably coupled to a track assembly 20 having rails 21, 22 and lever 23 for moving the vehicle seat assembly 10 between fore and aft positions as indicated by arrow A. As further shown in FIG. 1, a user control module 24 is mounted to a trim component 28. The user control module 24 can be used to adjust the vehicle seat assembly 10 with regards to position and comfort settings. A lever 25 is further coupled to trim component 28 and can be used to actuate pivotal movement of the seatback 13 relative to the seat module 12. A cap 26 is also shown in FIG. 1 mounted to trim component 28 which covers the pivotal mounting location of the seatback 13 to the seat module 12. As further shown in FIG. 1, a seatbelt buckle receptacle 27 is also mounted to the seat module 12 and a front trim component 29 is disposed on a forward-most portion of the seat module 12. The vehicle seat assembly 10, shown in FIG. 1, generally represents a driver or passenger side front seat assembly. However, it is contemplated that the vehicle seat assembly 10, and the method of assembling the vehicle seat assembly 10, can be positioned and used anywhere within a vehicle interior for supporting a vehicle occupant.

Figure 2:
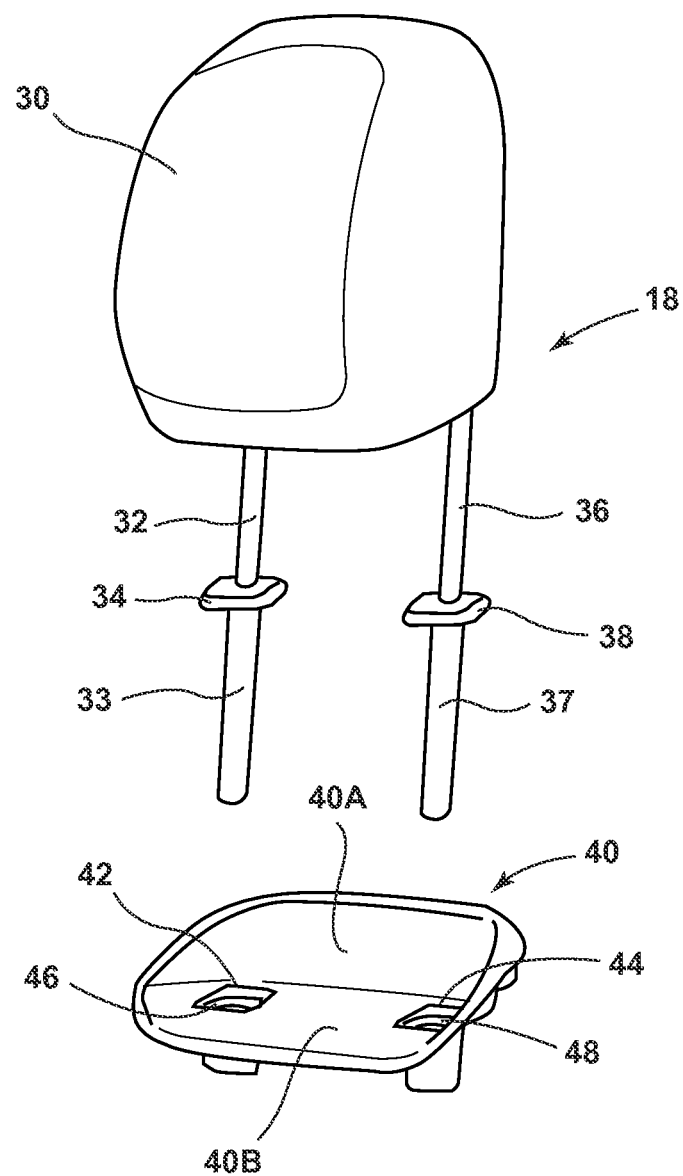
FIG. 2 is a perspective exploded view of a head rest assembly and guide sleeve module.

Referring now to FIG. 2, the headrest module 18 includes a head restraint 30 having first and second support posts 32, 36 extending downwardly therefrom. The first and second support posts 32, 36 include sleeves 33, 37 in which the first and second support posts 32, 36 are slideably received. The sleeves 33, 37 include head portions 34, 38, respectively, which are configured to fit into mounting apertures 42, 44 disposed in a guide member 40. The guide member 40 includes first and second guide channels 46, 48 through which sleeves 33, 37 are received. The guide member 40 includes a rear rim portion 40A and a substantially planar mounting portion 40B disposed adjacent thereto. In assembly, the head restraint 30 is mounted to the guide member 40 by having the first and second support posts 32, 36 received in sleeves 33, 37 which are further received in the first and second guide channels 46, 48 of the guide member 40. With the head restraint 30 mounted in the guide member 40, the headrest module 18 provides a robust head restraint execution that is easy to assembly while providing both comfort and safety features. The first and second guide channels 46, 48 disposed in the planar portion 40B of the guide member 40 define anchor holes to which the first and second support posts 32, 36 are operably coupled in assembly.

Figure 3A:
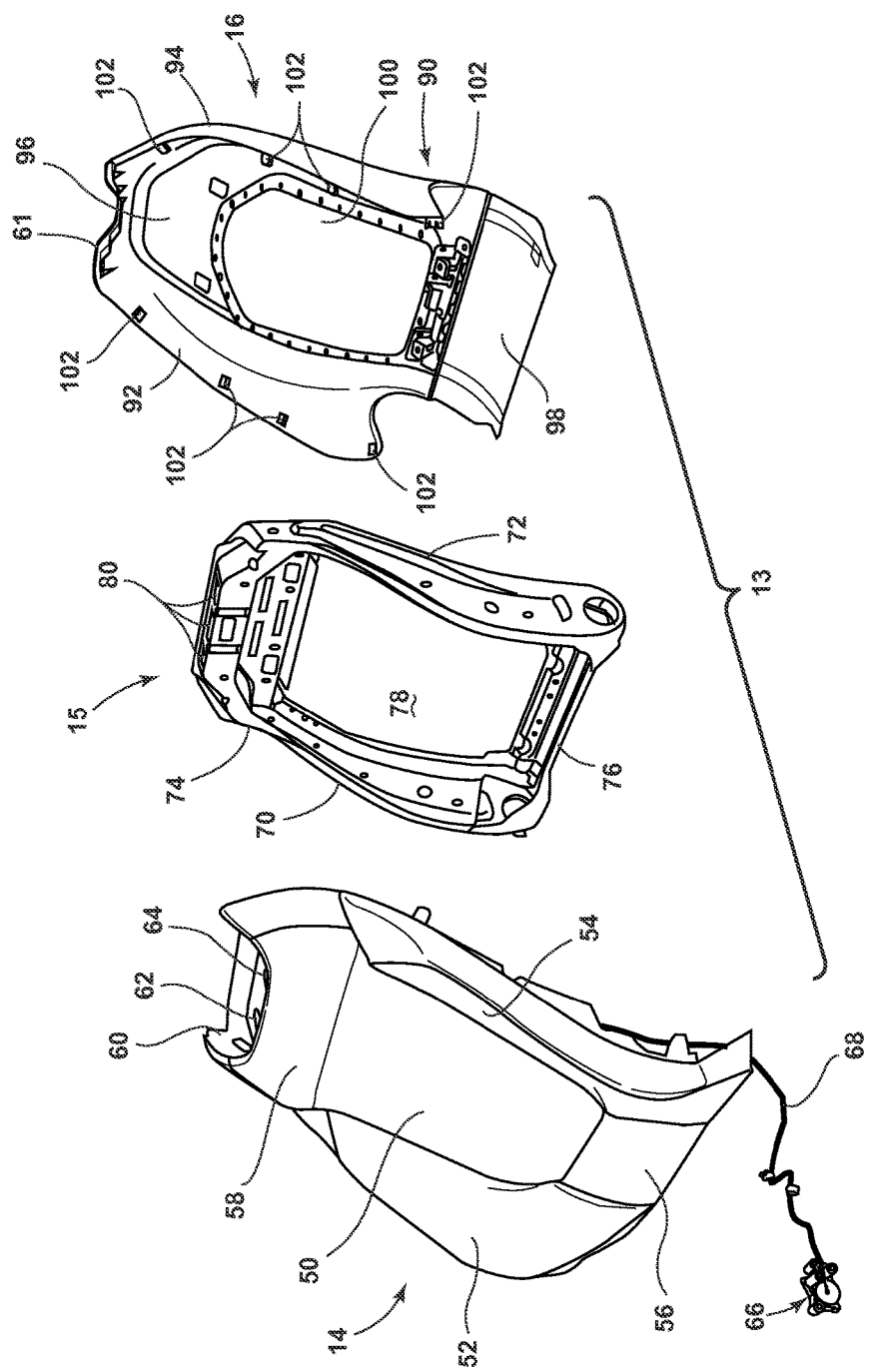
FIG. 3A is a perspective exploded view of a front seatback module and a rear seatback module exploded way from a seatback frame.

Referring now to FIG. 3A, the seatback 13 is shown in an exploded condition, wherein front seatback module 14 and rear seatback module 16 are exploded away from a seatback frame 15. The front seatback module 14 includes a center portion 50 having outer fins 52, 54 disposed on opposite sides thereof. The front seatback module 14 further includes a lower portion 56 and an upper portion 58. The upper portion 58 includes a mounting portion 60 having apertures 62, 64. In assembly, the mounting portion 60 is configured to receive the guide member 40 of the headrest module 18. Further, apertures 62, 64 are configured to receive the first and second guide channels 46, 48 of the guide member 40 as received in the mounting portion 60 of the front seatback module 14. The component parts 50-58 of the front seatback module 14 are contemplated to be comprised of a composite substrate using foam, upholstery covering, and trim attachment methods for repeatable assembly, feature content and comfort for the front seatback module 14. The component parts 50-58 are generally considered to be flexibly resilient cushion parts for cradling and supporting an occupant of the vehicle seat assembly 10. As further shown in FIG. 3A, a motor 66 is shown coupled to a cable housing 68, for controlling a lumbar support feature as further described below. The seatback frame 15 generally includes side members 70, 72 which are spaced-apart and interconnected by an upper cross member 74 and a lower cross member 76. The side members 70, 72 and upper and lower cross members 74, 76 are generally disposed about a central aperture 78, such that the side members 70, 72 and upper and lower cross members 74, 76 generally frame central aperture 78 in assembly. The upper cross member 74 includes a number of mounting apertures 80, any of which may be used to receive the first and second guide channels 46, 48 of the guide member 40 or the first and second support posts 32, 36 shown in FIG. 2 in assembly. The seatback frame 15 is contemplated to be a reinforced metal seatback frame for providing sufficient support for a vehicle occupant in use, as well as providing structural support for the attachment of the front seatback module 14 and rear seatback module 16.

Referring again to FIG. 3A, the rear seatback module 16 is shown having an outer shell 90, which generally includes side members 92, 94 which are spaced-apart and interconnected by upper and lower cross members 96, 98. A lumbar support member 100 is disposed between the side members 92, 94 and upper and lower cross members 96, 98. The outer shell 90 of the rear seatback module 16 further includes a plurality of mounting tabs 102 which are used to couple the rear seatback module 16 with the front seatback module 14 around the seatback frame 15. Specifically, the mounting tabs 102 are used in conjunction with a clip member or fastener to mount the rear seatback module 16 to a back carrier of the front seatback module 14, as further described below with reference to FIG. 3C. The mounting tabs 102 are generally disposed on the side members 92, 94 of the outer shell 90 along a perimeter thereof. The outer shell 90 further includes a mounting portion 61 which is disposed at an upper portion thereof and configured to align with the mounting portion 60 of the front seatback module 14 for cooperatively receiving the guide member 40 of the headrest module 18 as further shown in FIG. 3B. The outer shell 90 is contemplated to be an injection molded polymeric part, providing the structural rigidity necessary for the seatback assembly 110 shown in FIG. 3B. It is further contemplated that the outer shell 90 can be used for a rear seat assembly, as well as a front seat assembly.

Figure 3B:
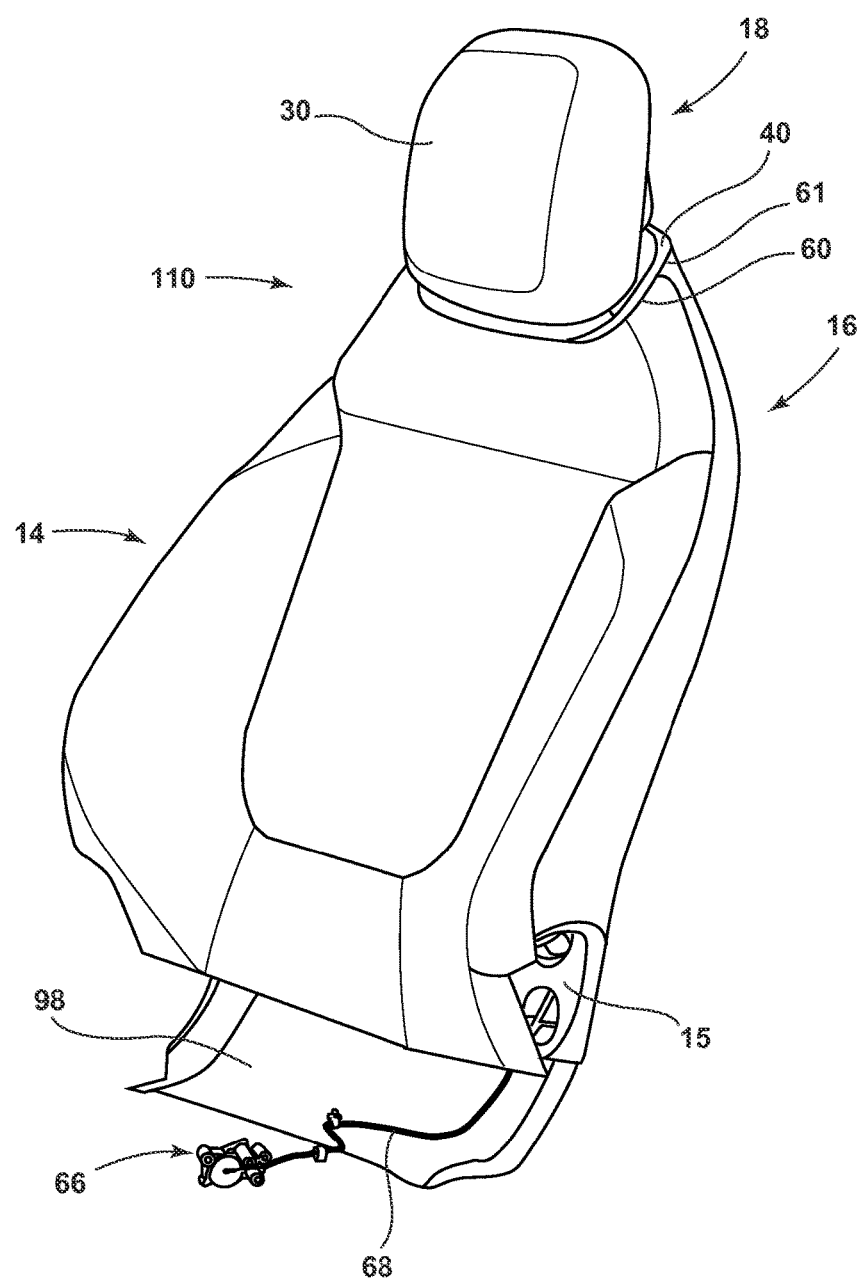
FIG. 3B is a perspective view of the front and rear seatback modules of FIG. 3A as assembled.

Referring now to FIG. 3B, an assembled seatback assembly 110 is shown, wherein the front seatback module 14 is coupled to the rear seatback module 16 with the seatback frame 15 disposed therebetween. As further shown in FIG. 3B, the guide member 40 is shown mounted to the mounting portions 60, 61 of the front seatback module 14 and the rear seatback module 16, respectively. In the assembled configuration of FIG. 3B, it is contemplated that the first and second support posts 32, 36 of the headrest module 18 have been received in the first and second guide channels 46, 48 of the guide member 40 to properly mount the headrest module 18 to the seatback assembly 110. Further, it is contemplated that the first and second support posts 32, 36 of the headrest module 18 have been received in guide channels 46, 48 which are further received in the mounting apertures 80 of the seatback frame 15 shown in FIG. 3A.

Figure 3C:
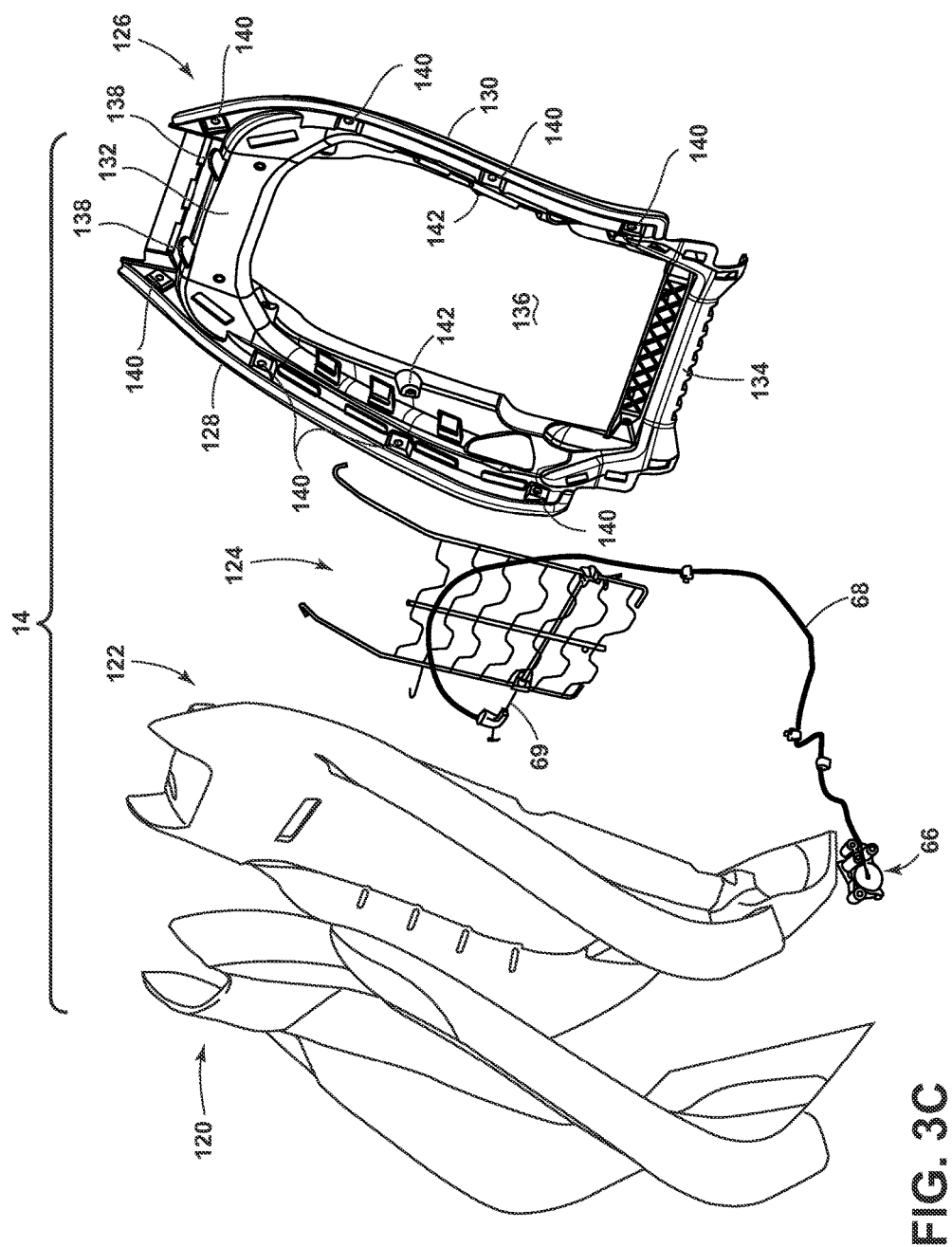
FIG. 3C is a perspective exploded view of the front seatback module of FIG. 3A.

Referring now to FIG. 3C, the front seatback module 14 is shown in an exploded view. The front seatback module 14 includes an upholstered cover 120 and a support cushion 122 which are both contoured components having reciprocal configurations, such that the upholstered cover 120 covers the support cushion 122 in assembly. The upholstered cover 120 is contemplated to be comprised of a fabric, vinyl or leather material, or other like covering material (or a combination thereof), while the support cushion 122 is contemplated to be comprised of a resilient foam material which may include areas of varying density or rigidity. In assembly, the upholstered cover 120 and support cushion 122 are further coupled to and supported by a back carrier 126. The back carrier 126 includes side members 128, 130 which are spaced-apart from one another and interconnected by upper and lower cross members 132, 134. Together, the side members 128, 130 and cross members 132, 134 generally frame a central aperture 136. A lumbar support mechanism 124 is also shown in FIG. 3C which is contemplated to be coupled to and controlled by motor 66 via cable 69 housed in cable housing 68. In assembly, the lumbar support mechanism 124 is generally mounted in aperture 136 of the back carrier 126. The upper cross member 132 of the back carrier 126 includes mounting apertures 138 for mounting the first and second support posts 32, 36 and sleeves 33, 37 of the headrest module 18 therein. As further shown in FIG. 3C, the side members 128, 130 include a plurality of mounting tabs 140 disposed around a perimeter thereof. The mounting tabs 140 are configured to generally align with the mounting tabs 102 of the rear seatback module 16 in assembly, for coupling the front seatback module 14 to the rear seatback module 16 as shown in FIG. 3B. The connection between mounting tabs 102 and mounting tabs 140 is contemplated to be anchored by a clip member or other like fastener in assembly. The side members 128, 130 of the back carrier 126 further include mounting portions 142 which are configured to couple the back carrier 126 to the seatback frame 15 (FIG. 3A) directly in assembly. It is further contemplated that the back carrier 126 can be used for a rear seat assembly, as well as a front seat assembly.

Figure 4B:
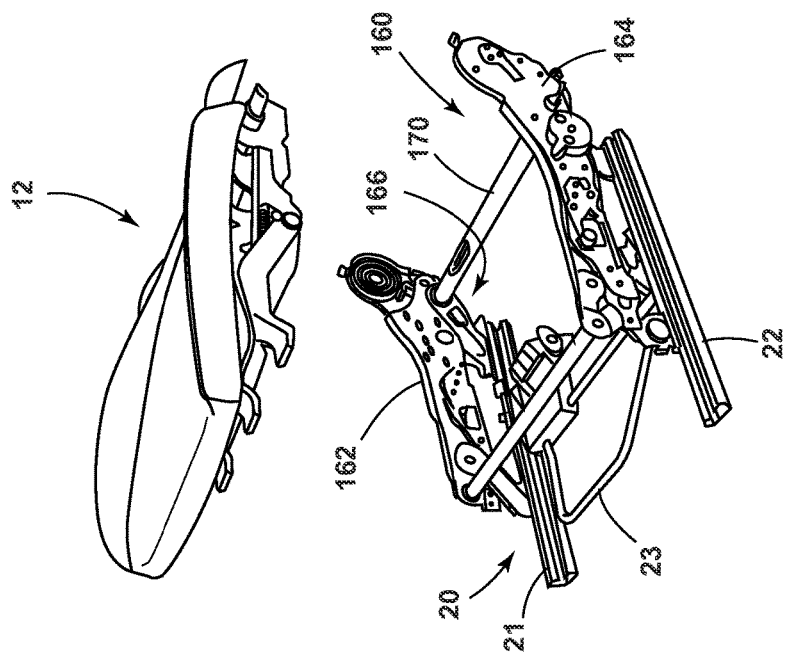
FIG. 4B is a perspective exploded view of the components of FIG. 4A as assembled and exploded away from a seat frame and track assembly.
Figure 4A:
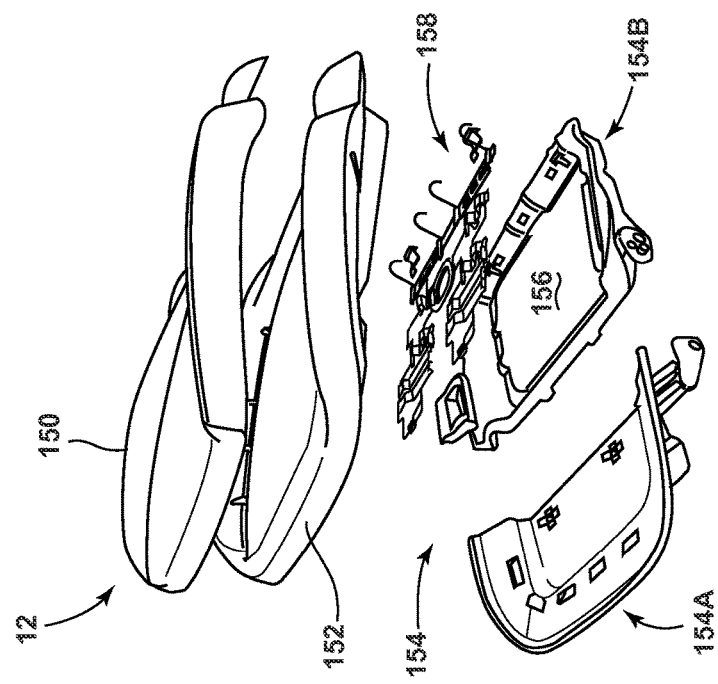
FIG. 4A is a perspective exploded view of a seat module of the vehicle seating assembly of the present disclosure.

Referring now to FIGS. 4A and 4B, the seat module 12 is shown. With specific reference to FIG. 4A, the seat module 12 includes an upholstered cover 150 and a support cushion 152. Both the upholstered cover 150 and support cushion 152 are contoured components having reciprocal configurations, such that the upholstered cover 150 covers the support cushion 152 in assembly. The upholstered cover 150 may be comprised of a fabric, vinyl or leather material, or other like covering material (or a combination thereof). The support cushion 152 is contemplated to be comprised of a resilient foam material which may include areas of varying density or rigidity. The seat module 12 further includes a carrier support 154 which generally includes a front portion 154A and a rear portion 154B. The rear portion 154B generally includes a central aperture 156 into which a flexible support assembly 158 is received. In assembly, the front portion 154A and rear portion 154B of carrier support 154 may be hingedly connected to one another, thereby allowing tilt adjustment of the seat module 12. Referring now to FIG. 4B, the seat module 12 is shown in an assembled condition and exploded away from a seat frame 160 disposed on track assembly 20. The seat frame 160 includes first and second side members 162, 164 which are coupled to rails 21, 22 using a four-bar linkage system 166 for vertical adjustment of the seat frame 160. First and second cross members 168, 170 are disposed between side members 162, 164 and are used to help retain the seat module 12 in place in assembly.

Figure 5:
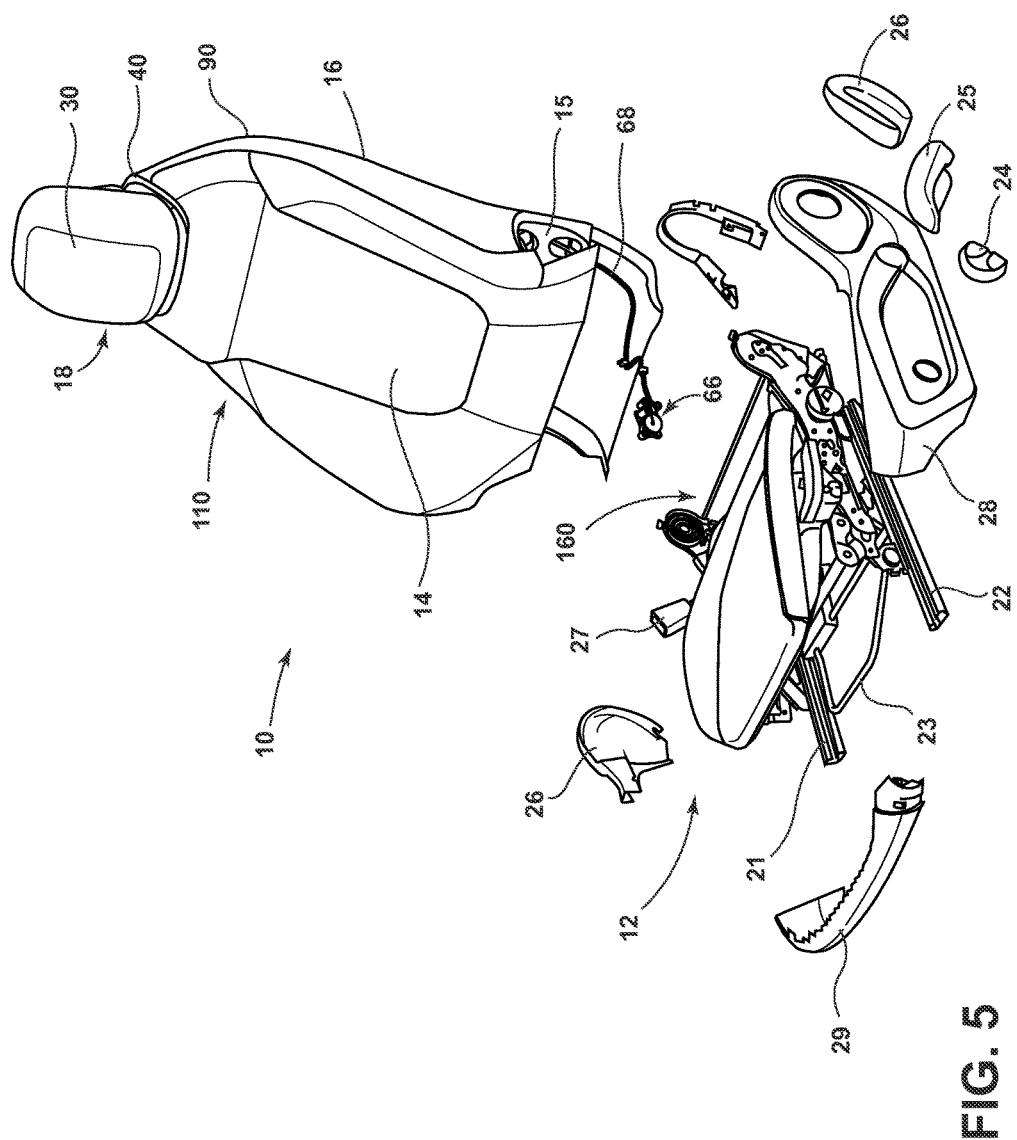
FIG. 5 is a perspective exploded view of the components of FIG. 4B as assembled with the seatback of FIG. 3B and various trim components exploded away therefrom.

Referring now to FIG. 5, the vehicle seat assembly 10 is shown with the seatback assembly 110 exploded away from the seat module 12. As discussed above, the seatback assembly 110 is generally comprised of a front seatback 14 module and a rear seatback module 16 which are operably coupled to one another and further coupled and supported by a seatback frame 15, which is disposed therebetween. The headrest module 18 includes a head restraint 30 which is received in a manner as described above, into guide member 40 disposed on an upper portion of the seatback assembly 110. The seat module 12, as shown in FIG. 5, is mounted to the seat frame 160 with trim components 28, 29 exploded away therefrom. In assembly, the trim components 28, 29 are coupled to the seat frame 160 and serve to cover the seat frame 160 and associated componentry, as shown in FIG. 1.

The present disclosure further includes a method of assembling the vehicle seat 10 in a more cost effective, efficient, and reliably repeatable manner. Ground-up assembly of a vehicle seat from a seat frame to a headrest is time consuming and complicated. The method of assembling the vehicle seat assembly 10 of the present disclosure involves the vehicle seat assembly 10 being constructed in a final assembly execution, wherein four separate preassembled modules are operably coupled to form the fully assembled vehicle seat assembly 10 shown in FIG. 1. The four preassembled modules generally include the seat module 12, the front seatback module 14, the rear seatback module 16, and the headrest module 18. As discussed above, the seat module 12 is shown in FIG. 4A in a disassembled condition, and further shown in FIG. 4B in a preassembled condition for mounting to the seat frame 160. The front seatback module 14 is shown in FIG. 3C in a disassembled condition, and further shown in FIG. 3A in an assembled condition. The rear seatback module 16 is shown in the preassembled condition in FIG. 3A. Finally, the headrest module 18 is shown in a disassembled condition in FIG. 2, and further shown in an assembled condition in FIG. 3B as mounted to the seatback assembly 110. Having the separate module components preassembled for a final assembly step makes for a cost effective and less time consuming assembling process for assembling the vehicle seat 10 as compared to a ground-up assembly.

Figure 6:
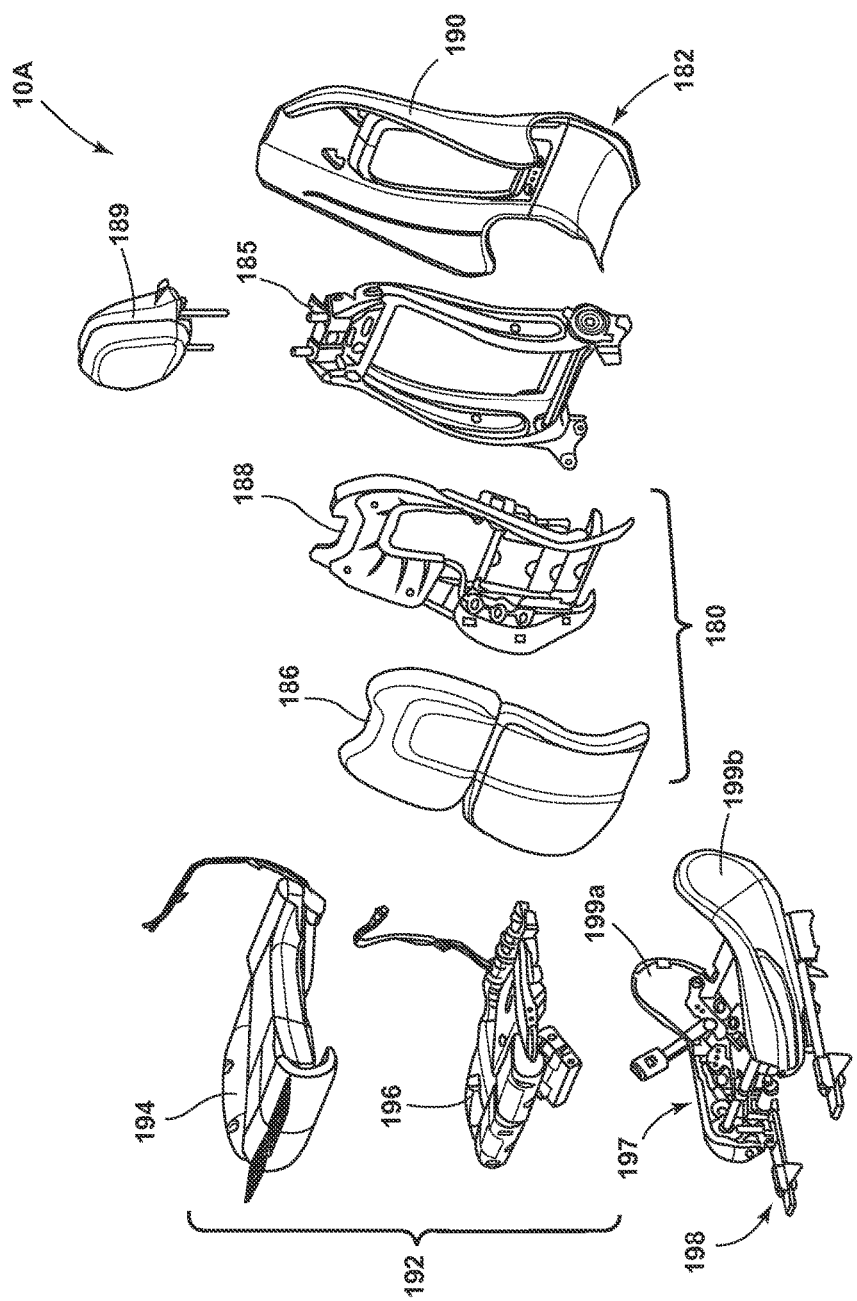
FIG. 6 is a perspective exploded view of a vehicle seat assembly according to another embodiment.

Referring now to FIG. 6, a vehicle seat assembly 10A is shown in an exploded condition and according to another embodiment of the present invention. A front seatback module 180 and rear seatback module 182 are exploded away from a seatback frame 185. The front seatback module 180 includes a back carrier module 186 and a back support module 188. The seatback frame 185 is contemplated to be a reinforced metal seatback frame for providing sufficient support for a vehicle occupant in use, as well as providing structural support for the attachment of the front seatback module 180 and rear seatback module 182. The rear seatback module 182 is shown having an outer shell 190, which is contemplated to be an injection molded polymeric part, similar to the outer shell 90 of seatback assembly 110 shown in FIG. 3B. The back carrier module 186 is contemplated to include a support structure and cushion material in a manner similar to the support cushion 122 described above with reference to FIG. 3C. The back carrier module 186 is further contemplated to receive a cover, much like the upholstered cover 120 shown in FIG. 3C. In assembly, the back carrier module 186 is configured to couple to the back support carrier 188 to form the assembled front seatback module 180. The assembled front seatback module 180 is configured to couple to the seatback frame 185 as well as the rear seatback module 182 to form an assembled seatback assembly, similar to seatback assembly 110 shown in FIG. 3B. The assembled seatback assembly is further configured to receive a headrest module 189, in a similar manner as headrest module 18 is received on seatback assembly 110 shown in FIG. 3B.

As further shown in FIG. 6, a seat module 192 includes a cushion carrier module 194 which is configured to couple to a cushion support module 196 in assembly. As coupled together, the cushion carrier module 194 and cushion support module 196 form an assembled seat module 192, similar to seat module 12 shown in FIGS. 4A and 4B. As further shown in FIG. 6, the seat module 192 is shown exploded away from a seat frame 197 disposed on track assembly 198. The seat frame 197 and track assembly 198 include trim components 199a and 199b coupled thereto and contemplated to be received in a preassembled condition for coupling to the seat module 192. The seat frame 197 and track assembly 198 are similar to the seat frame 160 and track assembly 20 shown and described above with reference to FIG. 4B.

Figure 7:
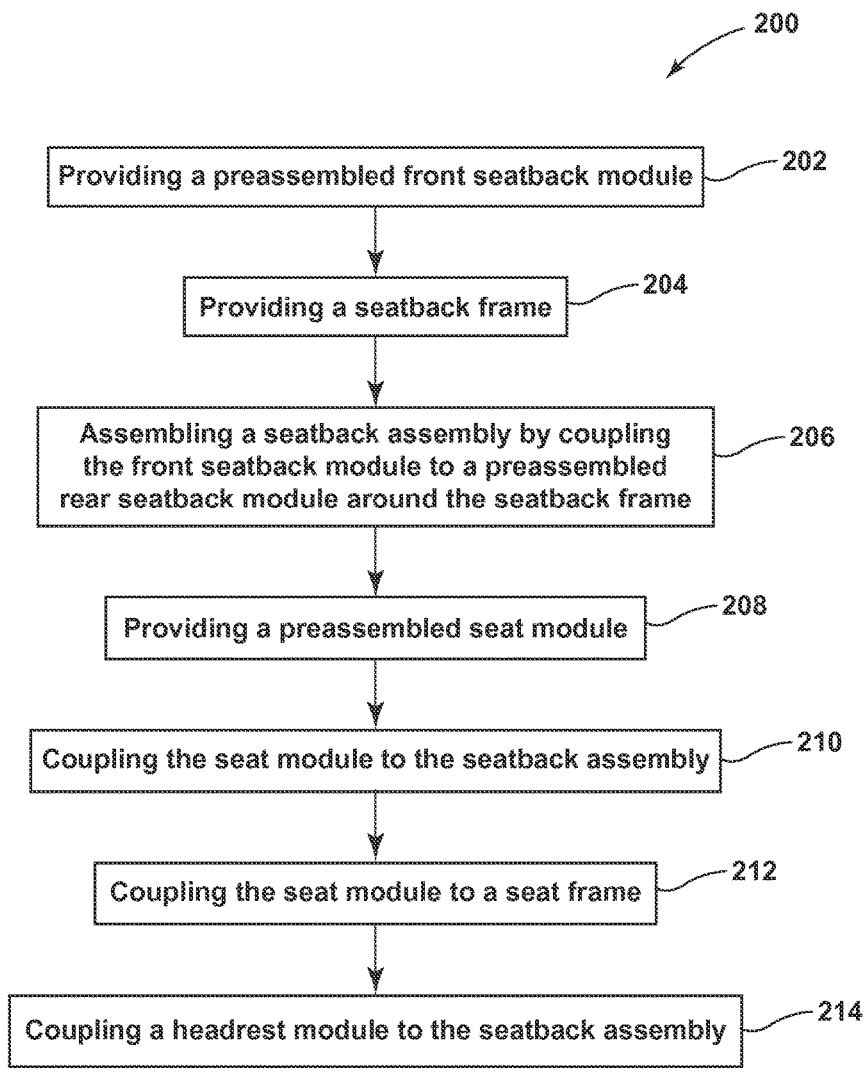
FIG. 7 is a flow chart representing a method of assembling a vehicle seat assembly according to one embodiment of the present disclosure.

Referring now to FIG. 7, a method of assembling a vehicle seat assembly is shown in the form of a flow chart.

In the method of assembling a vehicle seat assembly of the present disclosure, it is contemplated that the four preassembled modules discussed above will be provided for a final assembling process. With specific reference to FIG. 7, a method of assembling a vehicle seat assembly 200 is shown, wherein the initial step is identified as providing a preassembled front seatback module 202. The front seatback module provided in step 202 may be similar to the front seatback module 14 shown in FIG. 3A, or the front seatback module 180 shown in FIG. 6 having a separate back carrier module 186 and back support carrier 188. The next step indicated in the assembly method 200 is providing a seatback frame 204, wherein the seatback frame may be akin to the seatback frame 15 shown in FIG. 3A. The next step of the assembly method 200 includes assembling a seatback assembly by coupling the preassembled front seatback module to a preassembled rear seatback module around the seatback frame. This step generally relates to the assembling of the seatback assembly 110 shown in FIG. 3B using the front seatback module 14, rear seatback module 16 and seatback frame 15. The next step in the assembly method 200 includes the step of providing a preassembled seat module 208. The preassembled seat module provided in step 208 may be similar to the seat module 12 shown in FIGS. 4A and 4B, or the seat module 192 shown in FIG. 6 having a separate cushion carrier module 194 and cushion support carrier 196. The next step in the assembly method 200 includes coupling the seat module to the seatback assembly 210. It is further contemplated that the coupling of the seat module to the seatback assembly further includes the step of pivotally coupling the seatback assembly to the seat module. The next step in the assembly method 200 includes the step of coupling the seat module to a seat frame, wherein the seat frame is contemplated to be akin to the seat frame 160 shown in FIG. 4B. The final step in the assembly method 200 shown in FIG. 7 includes coupling a preassembled headrest module to the seatback assembly 214, wherein the headrest module is akin to the headrest module 18 shown in FIG. 2. Thus, the assembly method 200 is contemplated to be executed using four preassembled modules including a front seatback module, a rear seatback module, a seat module, and a headrest module. The modules described above with reference to FIGS. 1-5 are contemplated to be preassembled for the execution of the method indicated in FIG. 7. Having the modules preassembled for this final execution in the assembly process provides for a cost savings and a time savings in the overall assembly of a vehicle seat assembly as compared to a ground-up assembly currently in use. While the method shown in FIG. 7 includes steps 202-214, it is contemplated that the assembly method 200 can be carried out using an alternative chronology than that depicted in FIG. 7.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method of assembling a vehicle seat assembly, comprising the steps of:
   providing a preassembled front seatback module having a back carrier with first and second mounting apertures disposed on a mounting portion of an upper cross member thereof;
   providing a metal seatback frame having first and second mounting apertures disposed on an upper cross member thereof;
   assembling a seatback assembly by coupling the front seatback module to a preassembled rear seatback module around the seatback frame, such that the first and second mounting apertures of the back carrier are aligned with the first and second mounting apertures of the seatback frame;
   providing a unitary guide member having first and second guide channels downwardly extending from a mounting portion of the guide member;
   coupling the guide member to the seatback assembly by receiving the first and second guide channels of the guide member though the first and second mounting apertures of the back carrier and the first and second mounting apertures of the seatback frame, wherein an undersurface of the mounting portion of the guide member abuts the mounting portion of the front seatback module and abuts a mounting portion disposed on an upper portion of the rear seatback module;

providing a preassembled seat module;

coupling the seat module to the seatback assembly;

coupling the seat module to a seat frame; and coupling a preassembled headrest module to the seatback assembly.

2. The method of claim 1, wherein the step of providing a preassembled front seatback module further includes:

the preassembled front seatback module having a cover and a support cushion, the support cushion having first and second mounting apertures disposed on an upper portion thereof.

3. The method of claim 2, wherein the back carrier includes a plurality of mounting tabs disposed around a perimeter thereof.

4. The method of claim 3, wherein the
rear seatback module includes a plurality of mounting tabs disposed around a perimeter thereof.

5. The method of claim 4, wherein the step of assembling a seatback assembly further includes:

aligning the mounting tabs of the back carrier with the mounting tabs of the rear seatback module.

6. The method of claim 5, wherein the step of aligning the mounting tabs of the back carrier with the mounting tabs of the outer shell further includes:

coupling the front seatback module to the rear seatback module at the aligned mounting tabs using fasteners.

7. The method of claim 1, wherein the step of coupling a preassembled headrest module to the seatback assembly further includes:

the preassembled headrest module having a head restraint with first and second support posts downwardly extending therefrom, wherein the first and second support posts are received in the first and second guide channels of the guide member.

8. A method of assembling a vehicle seat assembly, comprising the steps of:

assembling front and rear seatback modules;

assembling a seat module;

assembling a headrest module;

releasably coupling the front and rear seatback modules to one another around a metal seatback frame, and directly coupling the front and rear seatback modules to a guide member to form a seatback assembly;

coupling the seat module to the seatback assembly; and coupling the headrest module to the seatback assembly;

wherein the step of releasably coupling the front and rear seatback modules around a seatback frame further includes aligning first and second mounting apertures disposed on an upper cross member of the seatback frame with first and second mounting apertures disposed on an upper cross member of the front seatback module;

wherein the step of coupling the headrest module to the seatback assembly further includes receiving first and second support posts of a heat restraint of the headrest module through first and second mounting apertures disposed through the guide member, further receiving the first and second support posts of the head restraint through the first and second mounting apertures of the front seatback module, and further receiving the first and second support posts of the head restraint through the first and second mounting apertures of the seatback frame.

9. The method of claim 8, wherein the step of releasably coupling the front and rear seatback modules to one another around a seatback frame further includes:

mounting one of the front seatback module and the rear seatback module to the seatback frame.

10. The method of claim 8, wherein the seatback assembly is pivotally coupled to the seat module.

11. A method of assembling a vehicle seat assembly, comprising the steps of:

providing a set of preassembled seat components including a front seatback module, a rear seatback module, a headrest module and a seat module;

coupling the seat module to a seat frame;

coupling the front seatback module to the rear seatback module around a metal seatback frame in a releasable manner to form a seatback assembly;

coupling the headrest module to the seatback assembly by providing a unitary guide member having a mounting portion with first and second guide channels extending downwardly from the mounting portion and received in first and second mounting apertures of the seatback frame, and further receiving first and second support posts of the headrest module in the first and second guide channels of the unitary guide member, wherein the unitary guide member is directly coupled to the front seatback module, the rear seatback module, and the headrest module; and coupling the seatback assembly to the seat module.

12. The method of claim 11, wherein upper portions of the front seatback module and the rear seatback module abut an underside of the mounting portion of the guide member.

13. The method claim 12, wherein the step of coupling the seatback assembly to the seat module further includes:

pivotally coupling the seatback assembly to the seat module.

14. The method of claim 11, further including:

coupling the seat frame to a track assembly.

* * * * *

UNITED STATES PATENT AND TRADEMARK OFFICE
CERTIFICATE OF CORRECTION

PATENT NO. : 10,011,205 B2
APPLICATION NO. : 14/619573
DATED : July 3, 2018
INVENTOR(S) : Line et al.

Page 1 of 1

It is certified that error appears in the above-identified patent and that said Letters Patent is hereby corrected as shown below:

Column 10:
Claim 8, Line 7;
"heat" should be --head--.

Signed and Sealed this
Eleventh Day of September, 2018

Andrei Iancu
*Director of the United States Patent and Trademark Office*